(12) United States Patent  
Kouru et al.

(10) Patent No.: US 10,977,640 B2  
(45) Date of Patent: Apr. 13, 2021

(54) SYSTEMS AND METHODS FOR IMPLEMENTING GLOBAL MONEY TRANSFERS

(71) Applicant: The Western Union Company, Englewood, CO (US)

(72) Inventors: Vijaya Kouru, Cupertino, CA (US); Tarun Bhagwan, Cupertino, CA (US); Sanjay Saraf, San Jose, CA (US)

(73) Assignee: The Western Union Company, Denver, CO (US)

( * ) Notice: Subject to any disclaimer, the term of this patent is extended or adjusted under 35 U.S.C. 154(b) by 296 days.

(21) Appl. No.: 14/793,222

(22) Filed: Jul. 7, 2015

(65) Prior Publication Data

US 2017/0011379 A1    Jan. 12, 2017

(51) Int. Cl.
*G06F 40/174* (2020.01)
*G06Q 20/32* (2012.01)
*G06Q 20/10* (2012.01)
*G06Q 20/02* (2012.01)
*G06Q 20/38* (2012.01)

(52) U.S. Cl.
CPC ....... *G06Q 20/3223* (2013.01); *G06F 40/174* (2020.01); *G06Q 20/027* (2013.01); *G06Q 20/10* (2013.01); *G06Q 20/3224* (2013.01); *G06Q 20/381* (2013.01)

(58) Field of Classification Search
CPC ... G06F 17/24; G06F 40/174; G06Q 20/3223; G06Q 20/381; G06Q 20/3224
USPC ......................................................... 715/221
See application file for complete search history.

(56) References Cited

U.S. PATENT DOCUMENTS

| | | | | |
|---|---|---|---|---|
| 9,014,662 | B1* | 4/2015 | Gailloux | H04W 4/24 379/114.01 |
| 2011/0282790 | A1* | 11/2011 | Bennett | G06Q 20/10 705/44 |
| 2014/0156435 | A1* | 6/2014 | Rahman | G06Q 20/10 705/21 |
| 2014/0201070 | A1* | 7/2014 | Liberty | G06Q 40/02 705/39 |

(Continued)

FOREIGN PATENT DOCUMENTS

WO    WO 2012125908 A2 *    9/2012    ............. G06Q 40/02

*Primary Examiner* — Kavita Stanley
*Assistant Examiner* — Tionna M Burke
(74) *Attorney, Agent, or Firm* — Kilpatrick Townsend & Stockton, LLP (57) ABSTRACT

Systems, methods, and apparatuses for configuring a web application for global money transfers include a customer mobile device, a processor, and a memory having processor-readable instructions that cause the processor to collect data from a web application, whereby the web application is provided on the customer mobile device in operative communication with the host computer, and determine at least one of an optional field and a required field based on the collected data. The at least one optional field and required field may receive input for conducting a money transfer. The processor-readable instructions may cause the processor to send instructions to a user interface ("UI") for the web application, whereby the instructions are indicative of the at least one optional field and required field, and configure the UI to display the at least one optional field and required field at the web application of the customer mobile device.

14 Claims, 5 Drawing Sheets

(56) References Cited

U.S. PATENT DOCUMENTS

2016/0055583 A1* 2/2016 Liberty ................ G06Q 40/02
705/37

* cited by examiner

SYSTEMS AND METHODS FOR IMPLEMENTING GLOBAL MONEY TRANSFERS

BACKGROUND OF THE INVENTION

Money transfers involve numerous regulatory and governmental requirements, which may vary across different countries and jurisdictions. Such regulatory requirements may include payment requirements, compliance requirements, and risk management requirements. Governmental, country-specific requirements may stipulate a maximum number of transactions, fund limits, identification collection procedures, and so on. These regulatory and governmental requirements are constantly changing with the dynamic and evolving nature of the global money transfers industry. As such, a money transfer facilitator that provides any money transfer products and services needs to constantly update each of its country-specific, money transfer desktop and mobile device applications to comply with the ever-changing environment.

Current methods for updating the web and mobile device applications are time-consuming, resource-intensive, and difficult to maintain. For instance, the money transfer facilitator operating in several different countries typically updates each country's web and mobile applications individually when changes are needed. Each mobile device application update usually requires hard-coding and releasing via distribution stores, such as APPLE and/or ANDROID app stores, which require the app-releaser to follow through various app-releasing procedures. There is a need for infrastructure that facilitates updating and maintaining a plurality of global web and mobile applications more efficiently and quickly. This disclosure is intended to address such needs and to provide related advantages.

BRIEF SUMMARY OF THE INVENTION

This invention generally relates to systems, methods, and apparatuses for money transfers, and more specifically, to systems, methods, and apparatuses for global money transfers.

In one aspect, the present disclosure provides a method for configuring a web application for global money transfers. The method may include collecting, by a host computer, data from the web application. The web application may be provided on a customer device in operative communication with the host computer. The method may include determining, by the host computer, at least one of an optional field and a required field based on the collected data. The at least one optional field and required field are configured to receive input for conducting a money transfer. The method may include sending, by the host computer, instructions to a user interface ("UI") for the web application. The instructions may be indicative of the at least one optional field and required field. Further, the method may include configuring, by the host computer, the UI to display the at least one optional field and required field at the web application of the customer device.

In another aspect of the present disclosure, a system for configuring a web application for global money transfers is provided. The system may include a customer mobile device, one or more processors and a memory communicatively coupled with and readable by the one or more processors. The memory may have stored therein processor-readable instructions that, when executed by the one or more processors, cause the one or more processors to collect, by a host computer, data from the web application, whereby the web application may be provided on the customer mobile device in operative communication with the host computer, and/or determine, by the host computer, at least one of an optional field and a required field based on the collected data, whereby the at least one optional field and required field are configured to receive input for conducting a money transfer. The processor-readable instructions may cause the one or more processors to send, by the host computer, instructions to a user interface ("UI") for the web application, whereby the instructions are indicative of the at least one optional field and required field, and/or configure, by the host computer, the UI to display the at least one optional field and required field at the web application of the customer mobile device In yet another aspect of the present disclosure, a computer-readable medium has stored thereon a series of instructions which, when executed by a processor, cause the processor to configure a web application for global money transfers. The series of instructions may include collecting, by a host computer, data from the web application, whereby the web application may be provided on a customer device in operative communication with the host computer, and/or determining, by the host computer, at least one of an optional field and a required field based on the collected data, whereby the at least one optional field and required field may be configured to receive input for conducting a money transfer. The series of instructions may include sending, by the host computer, instructions to a user interface ("UI") for the web application, whereby the instructions may be indicative of the at least one optional field and required field. Further, the series of instructions may include configuring, by the host computer, the UI to display the at least one optional field and required field at the web application of the customer device.

BRIEF DESCRIPTION OF THE DRAWINGS

The present invention is described in conjunction with the appended figures.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims. Thus, with regard to any specific embodiment discussed herein, any particular detail or aspect thereof may or may not be present in each contemplated version of that embodiment. Likewise, any particular detail or aspect of one embodiment discussed herein may or may not be present in any possible version of other embodiments discussed herein.

Further, specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to, portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In general, the systems, methods, and apparatuses disclosed herein are directed to a global module platform for money transfers. The global module platform is a configurable framework that supports the diverse and ever-changing regulatory and governmental requirements in the money transfers industry. In some examples, the global module platform disclosed herein may be supported by a money transfer facilitator ("MTF") or other financial services entity that provides goods and services related to money transfers. The MTF may operate globally, such as in conducting cross-border money transfers and/or international money transactions. The global module platform disclosed herein may facilitate the MTF's global operations by providing scalability and modifiability for a variety of different form factors that are utilized by the MTF's global operations. Such form factors may include, merely by way of example, tablet and/or mobile applications ("mobile apps"), tablet and/or mobile web pages ("mobile websites"), and desktop and/or full web pages ("desktop websites"). In the present systems, methods and apparatuses, each of these form factors is country-specific yet share a common configurable frameworks, such that any updates in order to comply with the dynamic rules and regulations may be performed at the configurable frameworks level to yield country-specific form factors. With the systems, methods, and apparatuses disclosed herein, these mobile apps, mobile websites, and desktop websites may be quickly and efficiently maintained and up-to-date with the ever-changing money transfers environment.

In one example, the systems, methods, and apparatuses disclosed herein provide for a global funds transfer mobile application that has a built-in sync adapter library. The sync adapter library is updatable via continuous communications with a sync service that is supported, at least partly, by a host system of the MTF. The sync service may update the sync adapter library at any time with appropriate compliance rules and/or user interface configurations. In this way, the mobile application may be utilized in different countries, as it may be constantly reconfigured and updated by the sync service to operate in accordance with the instant country-specific rules and regulations. In another aspect, company-wide related changes in policies and procedures of the MTF may also be rolled out to the mobile application globally, efficiently, and quickly via the sync service and the sync adapter library. Other examples are possible.

It is contemplated that the global funds transfer mobile application may be implemented on a variety of different smart phone and/or tablet devices. The mobile application may initially be downloaded onto a device from an app store, such as an Android and/or iOS app store, and may reside on the device. In some cases, the mobile application may provide certain functionalities without an internet connection. Merely by way of example, transaction details for a desired money transfer may be entered and saved for submission until an internet connection becomes available; reminders, notifications, and/or login capabilities may be active; settings and/or user preferences may be accessed, changed, and saved without internet connection.

In practice, the mobile application may facilitate cross border money transfers with global funds-in and funds-out transactions, and comply with country-specific compliance and regulation rules. Merely by way of example, such rules may include a maximum number of transactions, transaction limits, identification collection procedures and documentation, and so on. The mobile application may also provide risk management, fraud detection and mitigation, and/or other payment integrations.

Various benefits may be contemplated. The global funds transfer mobile application may be utilized worldwide by a geographically diverse set of local, regional, and international customers of the MTF. The mobile application may quickly incorporate any changes in compliance and regulatory requirements via the sync service by sending and/or receiving new rules and data required to comply with new rules. Further, updates to the mobile application may be provided without requiring significant hard-coding, which may be unique to an operating system of the mobile device, such as iOS and/or Android operating systems. A further benefit of the configurability aspect of the mobile application is that updating the mobile application as described herein does not necessitate formalized distribution procedures that may be required by the Android and/or iOS app stores. For instance, the present systems, methods, and apparatuses allow the mobile application to be updated and/or maintained in a continuous and/or automatic fashion, i.e. without user interaction, without having to be resubmitted, released, and deployed via the app stores each time. It is noted that formalized app distribution procedures may not necessarily be eliminated, but that a need for such roll-outs may be reduced and reserved for more significant and code-intensive restructuring or overhauls of the mobile application. Still, greater scalability and modifiability to meet the changing needs of the mobile application are achieved, even while the mobile application is running Given the variety of different native codes for different operating systems, the country-to-country variation of rules and regulations, and the dynamic nature of the rules and regulations in the money transfers industries, it is contemplated that the versatility of the present systems, methods, and apparatuses described herein may provide significant time and resource savings, while increasing opportunities to expand the MTF's global presence. Other examples and benefits may be contemplated.

As another example, the systems, methods, and apparatuses disclosed herein provide for a common global money transfer front-end framework that provides various smart widgets. The common framework may support different front-end mobile websites and desktop websites, which may each offer different user interfaces. For instance, the mobile websites may be customized for access using a smart phone and/or tablet mobile device, while the desktop websites may be configured as a full website for access using a desktop and/or laptop computer. Further, the common website framework may support additional variations, such as regional website variations across the globe, and/or may be leveraged by third party companies. It is contemplated that with the common website framework, all or substantially all of the MTF's money transfer websites, including user interfaces thereof, may be developed and maintained contemporaneously or with a common codebase while still allowing each type of website to vary device-by-device and/or country-by-country.

In practice, the common global money transfer front-end framework may reduce costs by accommodating the diverse regulatory requirements, country-specific compliance rules, and/or device-specific user interfaces with a shared codebase. By providing the common framework that may be leveraged across a variety of devices, geographies, and third party companies, the MTF may expand its operations into other countries and customer bases more efficiently. The configurable smart widgets of the common framework may allow the framework to cater to different money transfer issues in different countries. Merely by way of example, such money transfer issues may include risk assessment and management, payment methods, and compliance requirements. Other examples benefits may be contemplated.

In another example, the systems, methods, and apparatuses disclosed herein provide for a common global money transfer presentation services API (application programming interface). The common API may support the different front-end websites by providing specific tags and/or fields that correspond to the variety of mobile apps, mobile websites, and desktop websites. Merely by way of example, such tags and/or fields may include mandatory and/or optional fields designed to receive user and/or transaction-related input, and identification collection documentation requirements. The common API may be context-aware to provide various user interfaces based on various situational and/or environmental information, including GPS coordinates, network connection(s), user personal preferences, accelerometer sensed data, and/or other types of data sensed at the mobile device. For instance, the common API may provide user interfaces that are country-specific, regulations-specific, and/or language-specific, based on the data received from the mobile device. In an aspect, the common API may operate generically, that is, above other layers which specify various rules and/or regulations, while still being responsive to the mobile applications, mobile and desktop websites, and/or other client device software with specialized information. In another example, the common API may implement a lightweight REST (REpresentational State Transfer) protocol to accommodate any variations of such software.

In general, it is contemplated that the systems, methods, and apparatuses described herein for the global module platform, which includes the common framework and common API that provide and support the various mobile applications, mobile websites, and desktop websites, may facilitate a variety of global money transfer-related issues. In particular, the global module platform may support different money transfer methods, payment methods, credit card and/or bank accounts, cash payouts, bank payouts, compliances regulations, identification requirements, risk management, fraud detection, and/or other responsibilities of the MTF. As the money transfer issues vary across different countries, and vary frequently throughout time due to the dynamic nature of the industry, the global module platform allows updates to be deployed throughout the system quickly, efficiently, and without significant delays and complications as found in traditional approaches. In some cases, such updates may be performed automatically and substantially invisibly to the customer.

In another aspect, the systems, methods, and apparatuses described herein allow the provider, such as the MTF, to free up resources that may be reallocated toward focusing on other aspects of the business beyond maintaining and updating its global online presence via multiple front-end frameworks across multiple form factors and country-specific requirements. Merely by way of example, the freed resources may be used for enhancing customer experience and/or adding new software functionalities. In this way, further cost savings and optimizations may be realized. Other benefits and examples are possible.

Figure 1:
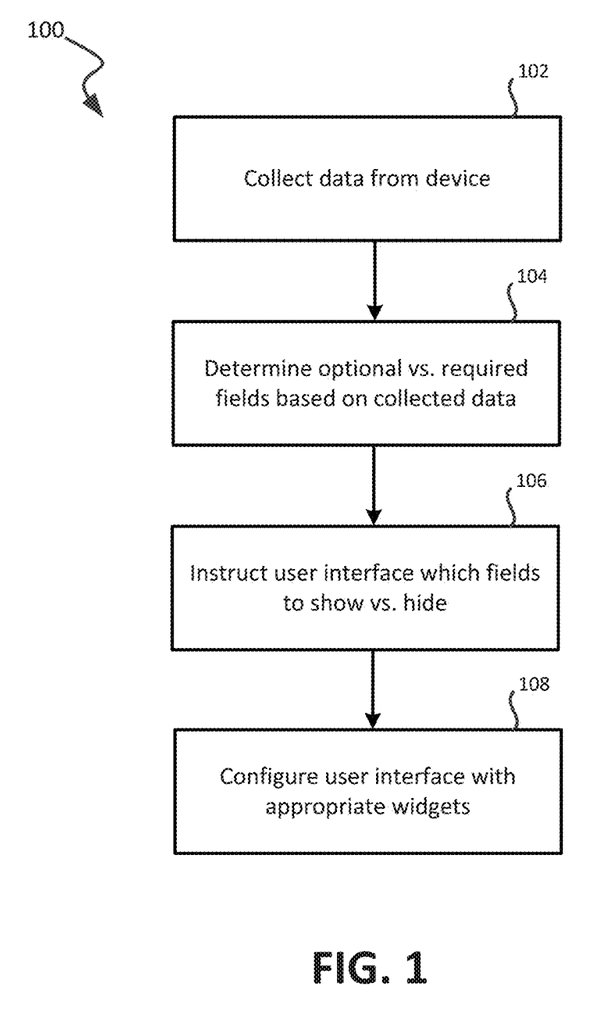
FIG. 1 shows an example method for implementing global money transfer, according to various embodiments of the present invention.

Turning to FIG. 1, an example method 100 that may be supported by the global modules platform is illustrated. The method 100 may be supported at least in part by a host system, such as a computer system, of a money transfer facilitator or provider having the platform. It is noted that method 100, and any of the other methods shown herein, may include additional steps, and that any of the method steps may be reordered, combined with other steps or features from other methods and/or examples, and/or be optional.

The method 100 may include collecting data from the mobile device (step 102). For instance, the host computer may collect data from a money transfer web application, such as a mobile app, a mobile website, and/or a desktop website that is provided on and/or otherwise accessed by a customer mobile device. It is contemplated that the customer mobile device is a smart phone, a tablet, and/or a laptop in operative communication with the host computer, such as through a wireless network connection. Other form factors and devices are possible. In another aspect, the host computer may request the data from the web application. Such requested data may include geocoordinates of the customer device, and/or any other type of data sensed at by the web application and/or by sensors on the customer mobile device, such as an accelerometer and/or a GPS system. In another aspect, the geocoordinates may be based on user input, such as a source and/or destination location for the money transfer. It is noted that any of the data requested by the host system and/or otherwise collected by the host system may be sensed or otherwise automatically provided by the mobile device and/or based on a user's manual input at the mobile device.

The method 100 may include determining optional and/or required tags or fields based on the collected data (step 104). For example, the host computer may determine at least one of an optional field and a required field based on the collected data, whereby the at least one optional field and required field are configured to receive input for conducting a money transfer. In another aspect, the method 100 may include determining, by the host computer, country-specific data based on the geocoordinates of the customer mobile device. The host computer may wirelessly push and/or otherwise send the determined country-specific data to the web application for conducting the money transfer. Such country-specific data may include, merely by example, a foreign exchange rate, a currency, and/or a compliance regulation.

The method 100 may include instructing a user interface ("UI") which fields to show and/or hide on the device (step 106). For example, the method 100 may include sending, by the host computer, instructions to a user interface ("UI") for the web application. The instructions may be indicative of the at least one optional field and required field. In another aspect, the host computer may sync with a sync adapter library at the web application in order to continuously update the sync adapter library with the one or more country-specific data. Further, the host computer may instantiate an update to the UI of the web application based on the one or more synced country-specific data at the web application.

It is noted that the sync adapter library may be built-in to certain web applications, such as mobile apps described herein. The sync adapter library may be configured to meet compliance rules and regulations by continuously building and/or modifying the library according to rules and regulations pushed from the host system, such as an API of the host system. For example, the mobile app at the tablet and/or smart phone mobile device may be configured to connect to a server at the host system via a wireless and/or cellular network connection to obtain all details for a particular operating country. The particular country may be identified by user input into the mobile app and/or based on GPS coordinates detected by the mobile application and/or the smart phone. By keeping the mobile app in sync with the sync service, the mobile app may be configured for a particular operating country's market.

The sync adapter library may be configurable to handle variations in the rules and regulations for money transfers, such as compliance rules, changing currencies and/or exchange rates, and facilitate the mobile app in operating under such rules. For example, the sync adapter library may facilitate the mobile app in providing different user interface requirements across different countries. More particularly, the sync adapter library may communicate with a sync service that handles at least a portion of the updates to compliance rules and user interfaces. The sync service may further facilitate updating of user interfaces provided by the mobile application, whereby such changes may be pushed or otherwise provided without requiring an application release process through app stores, such as Apple and/or Android app stores. In another aspect, a user of the mobile application may not need to manually download such updates to their smartphones each time. Rather, the sync service may automatically synchronize the mobile application with the updated rules and user interfaces determined to be applicable at the time. It is noted that the sync service may be provided at the host system, and/or more specifically, by the global modules platform.

The method 100 may include configuring the UI with appropriate widgets (step 108). For instance, the host computer may provide one or more widgets for the UI of the web application. The one or more widgets may be configurable to meet the country-specific requirements. The host computer may further send instructions to the UI of the web application indicating one or more widgets for display on the UI. Such instructions may be communicated by one or more APIs (application programming interface) on the host computer. In another aspect, the host computer may configure the UI to display the at least one optional field and required field at the web application of the customer device.

It is noted that the widgets may be dynamic widgets, such as smart widgets, and/or static widgets. The dynamic widgets may be configured by the API at the global modules platform of the host system to customize the web application to the particular money transfer situation and/or environment. For instance, the dynamic widget may be customized with country-specific data pertaining to the relevant operating countries for an intended money transfer, and/or receive user input and/or data that is country-specific data. The static widgets may be constant across all web applications supported by the host system, and/or may be constant for each form factor. Merely by way of example, such static widgets may include a family name, operating country, and/or language. In another aspect, the static widget may be configured with common elements in the widget that are applicable across all or most money transfer situations, while the dynamic widgets may be configured by the API in communication with the web application.

It is further contemplated that the widgets described herein may be leveraged by any of a variety of form factors, including mobile apps, mobile websites, and desktop websites. In another aspect, the widgets may be leveraged, alternatively and/or additionally, by third party systems in communication with the host system and/or more specifically, its global modules platform. Widgets may be provided in JavaScript, HTML, CSS, and/or a combination thereof, and/or other languages. For instance, each widget may include a combination of presentation and functionality aspects, such as HTML for structuring contents of the widget, CSS for presenting and styling the widget, and/or JavaScript for adding functionality and interactive aspects to the widget and data collected therein. It is noted that languages may vary based on each form factor and/or mobile app platform. Merely by way of example, Java may be common in Android mobile devices, Objective-C in iOS devices, and Visual C++ in Windows Mobile devices.

Further, each smart widget may be self-contained and independently configurable by one or more APIs to meet country-specific requirements. For example, a smart widget may adjust to different money transfer funds-in and/or funds-out requirements, compliance requirements, and/or payment integrations. Each widget may contain one or more different fields or tags, which may be required and/or not required for certain country-specific money transfers. For instance, each country may require different fields and/or user responses for initiating and/or receiving money transfers. Merely by way of example, a sender's middle name may be required for initiating a money transfer in one country, while not required for other countries. Identification and/or verification information may vary across countries. For instance, in some countries a passport is required for verification in money transfers, and/or a question and answer security check must match between a sender and a receiver in order to complete a money transfer. In these cases, the one or more mobile apps may include a widget for receiving a user's middle name, a widget for capturing a passport number, barcode and/or photograph, and/or a widget for receiving input for the question and answer check. With the configurable UI and widgets therein, the mobile app may provide a variety of relevant user experiences and functionalities.

Further, each widget may allow internal users at the host system and/or compliance users at the host system to configure the widget, such that when compliance regulations and/or any rules change, the widgets may be updated and subsequently provided to the web applications. Each widget may override any existing presentations of web applications. Such existing presentations may be based on a CSS that describes a style and/or formatting of an electronic document. In a further example, each smart widget may be multi-language aware to provide language-specific widgets, and/or may integrate with one or more content management systems of the global modules platform to provide language awareness capabilities, e.g. present the widget in a correct or preferred language.

Figure 2:
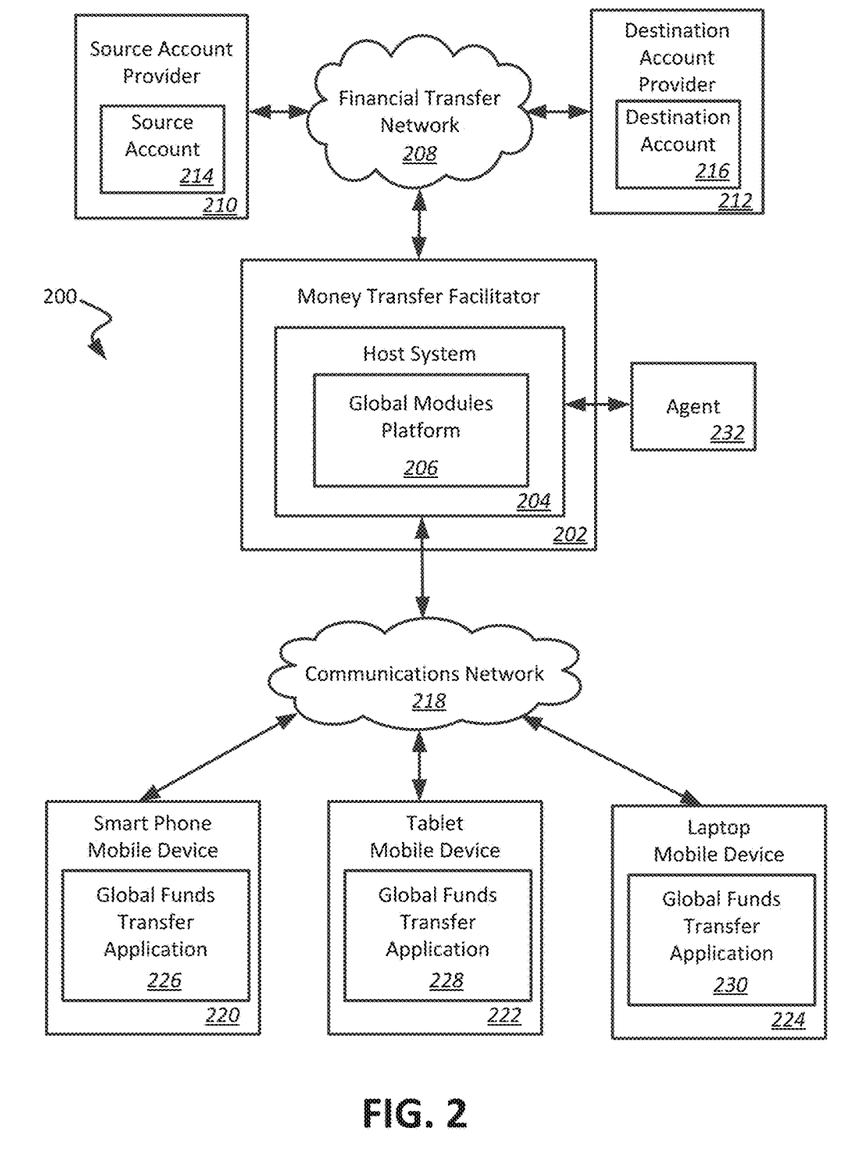
FIG. 2 shows an example system for implementing global money transfer, according to various embodiments of the present invention.

Turning now to FIG. 2, a schematic diagram of an example system 200 for global money transfers according to various methods and embodiments discussed herein is shown. It is noted that variations are possible, and that some connections and/or entities may be omitted merely for simplicity in the diagram. The system 200 may include a money transfer provider or money transfer facilitator ("MTF") 202, e.g. systems operated by Western Union or another money transfer provider. The MTF 202 may include a host system 204, such as a host computer system and/or server that provides a global modules platform 206, among other hardware and software components. It is contemplated that the global modules platform 206 may provide or otherwise assist the host system 204 in providing the various implementations for conducting global money transactions described herein, such as any steps shown in method 100. For example, the global modules platform 206 may provide and/or otherwise assist in providing the configurable components for the mobile app, mobile website, and/or desktop website discussed herein.

The MTF 202, and/or more specifically the host system 204, may be communicatively coupled with various networks, such as a financial transfer network 208. Also communicatively coupled with the financial transfer network 208 may be one or more account providers 210 and 212, which may maintain, control, or otherwise manipulate source and destination accounts 214 and 216, respectively. The source account 214 may be any of a variety of accounts, such as a traditional bank account, in which case source account provider 210 may be a financial institution. According to other embodiments, the source account 214 may be a virtual (or e-money) wallet, in which case the source account provider 210 may be a mobile operator or agent. Similarly, the destination account 216 may be any of a variety of accounts, such as a bank or virtual (e-money) account, and the destination account provider 212 may be a financial institution, mobile operator, or agent accordingly. In some examples, the source account provider 210 and the destination account provider 212 may be cross-border or foreign providers to one another. It is noted that the MTF 202 may be connected via the financial transfer network 208 to a plurality of source and destination account providers that are not shown for simplicity.

Further, the MTF 202, and/or more specifically the host system 204, may be communicatively coupled with one or more communications networks 218. Also communicatively coupled with the communications network 218 may be one or more customer devices, such as a smart phone mobile device 220, a tablet mobile device 222, and/or a laptop mobile device 224. It is noted that numerous devices of various form factors may be connected to the MTF 202 via the communications network 218. In the present example, each mobile device 220,222,224 may provide global money transfer capabilities via a global funds transfer application 226,228,230, respectively. Each global funds transfer application 226,228,230 may be configured to communicate with the global modules platform 206, such as an API of the platform 206, to collect data, send and/or receive data, and obtain appropriate user interfaces and/or smart widgets based on situational data in order to provide the appropriate global money transfer capabilities. Further, each global funds transfer application 226,228,230 may be configured for a specific form factor. For instance, the global funds transfer application 226 may be configured as a mobile app on the smart phone mobile device 220 and/or as a mobile website that is accessed by the smart phone mobile device 220. The global funds transfer application 228 may be configured as a mobile app on the tablet computer mobile device 222 and/or as a mobile website that is accessed by the tablet mobile device 222. The global funds transfer application 230 may be configured as a web page that is accessed by the laptop mobile device 224, and/or may be accessible by the smart phone mobile device 220 and/or the tablet mobile device 222. Other examples and variations are possible.

It is noted the money transfer provider system 200 may support global money transfers that are initiated by a sender and/or completed by a recipient electronically. However, variations are possible. For instance, the recipient of a money transfer may also receive money in cash at one or more agent locations 232. Such agents may comprise an individual, group, retail location, or other entity that allows customers to access services of the MTF 202. In other cases, a sender may initiate a money transfer in cash at the regular agent location 232. Still in other examples, money transfers may be performed using a combination of in-person, telephonic, and/or wireless communications pathways. Generally speaking and as understood by one skilled in the art, the MTF 202 may access the source account 214 of one account provider 210 and/or the destination account 216 of the same or a different account provider 212 to affect a transfer from and/or to the accounts 214 and 216 via the financial transfer network 208.

The money transfer provider system 200 may also be adapted to identify the entities and/or accounts associated with a transaction and/or determine a destination for a payment of the transaction. For example, the entities and/or accounts may be identified based on data maintained in a verification database or other repository. Such data may be maintained internally or externally to the money transfer provider system 200. In one example, the verification database may be maintained by the host system 204 of the MTF 202. Other examples and communications pathways are possible.

Figure 3:
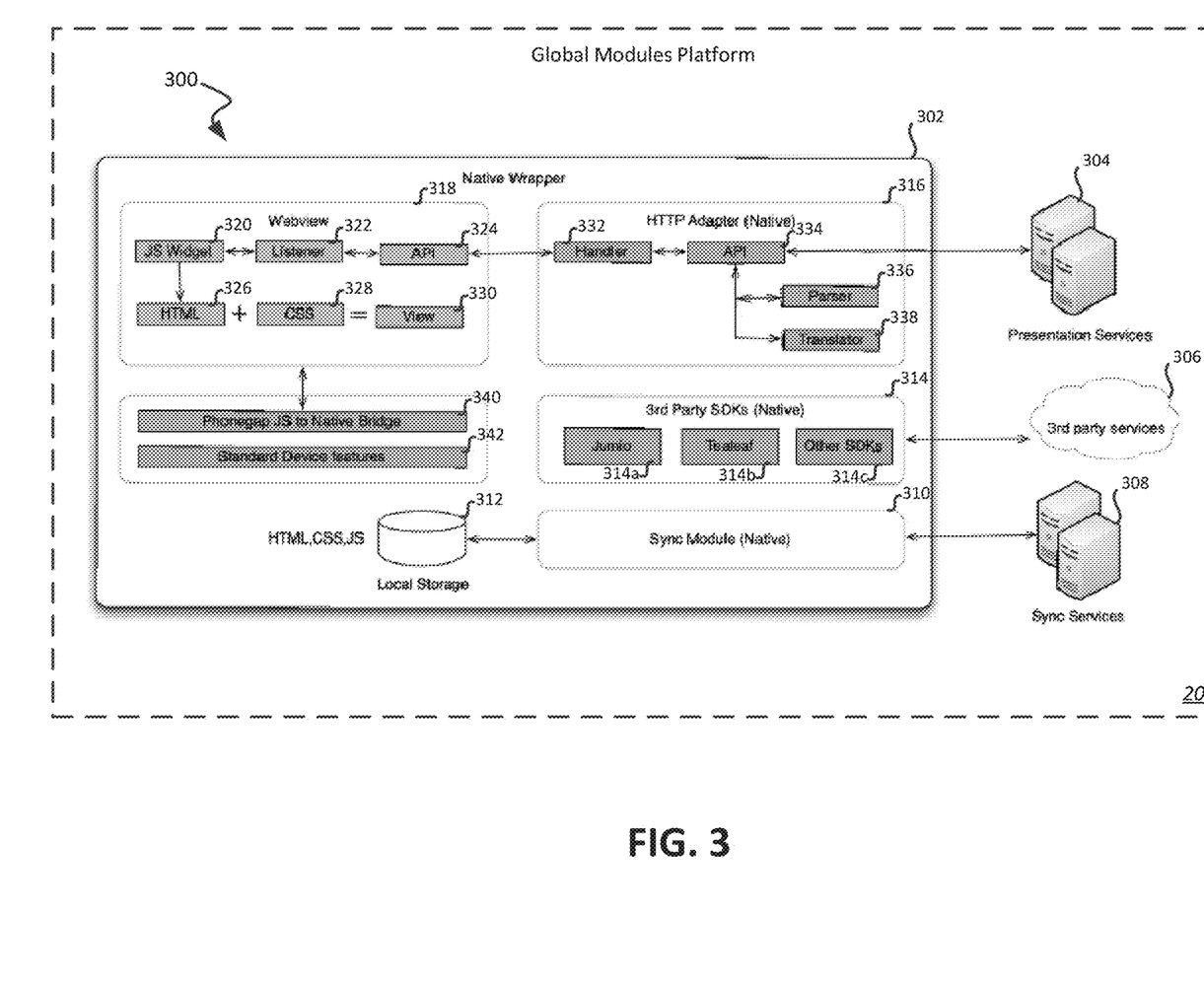
FIG. 3 shows an example architecture supporting a mobile application, according to various embodiments of the present invention.

Turning to FIG. 3, an example architecture 300 for supporting a mobile app, such as the previously described global funds transfer mobile application that may be provided on a smart phone and/or tablet device, is shown. It is noted that additional components and/or connections thereof may be contemplated, and that such components and connections may be omitted in the figure for simplicity. Further, any connections may be unidirectional and/or bidirectional. It is contemplated that all or portions of the architecture 300 may be provided by the global modules platform 206 at the host system 204 of FIG. 2, and/or at the smart phone or tablet mobile devices.

The architecture 300 may include a native wrapper 302 or software computer program stored at a memory device on the global modules platform 206 and/or provided by the host system 204. The native wrapper 302 may interact with, or otherwise provide, one or more presentation services 304, third party services 306, and/or sync services 308. Further components and/or features of such services 304,306,308 may also be provided as components of the global modules platform 206 and/or provided by the host system 204. The native wrapper 302 may contain additional various components that are in operative communication with the presentation services 304, third party services 306, and sync services 308.

For instance, a sync module 310 may be provided at the native wrapper 302 to facilitate data communications between a local storage module 312 module and the sync services 308, which may be configured to sync with a sync adapter library of the mobile app. In another aspect, the sync module 310 may provide the sync services 308. The local storage module 312 may provide various dynamic and/or static widgets that are coded in HTML, CSS, Java Script, and/or any combination thereof. Further, the local storage module 312 may include one or more country-specific data, compliance rules, currencies, exchange rates, money transfer rules, identification data requirements, and so on. The sync module 310 may be configured to push such widgets and/or details for a certain operating country to the sync adapter library of the mobile app, and/or ensure that the sync adapter library is continuously in sync and updated with country-specific requirements. In another aspect, the sync module 310 may determine appropriate widgets and/or data to be pushed, and/or received, via the sync services 308 based on data collected from the mobile app. Such data may include geocoordinates of the mobile device, and may further be collected by the sync module 310 when the mobile app is synced via the sync services 308. Other examples are possible.

A third party SDK 314 (software development kit) may be provided at the native wrapper 302 to facilitate and/or provide various third party services 306. SDKs may include various tools to facilitate creation of applications and/or certain features of applications for certain software packages, frameworks, hardware platforms, operating systems, and other development platforms. Merely by way of example, the native wrapper 302 may provide a Jumio SDK 314a, a Tealeaf SDK 314b, and/or one or more other SDKs 314c.

A HTTP adapter 316 module may be provided to communicate with, and/or to provide, the presentation services 304. The HTTP adapter 316 may be in operative communication with a webview module 318 of the native wrapper 302. The webview module 318 may include various JavaScript widgets 320, event listeners 322, and/or APIs 324. The JavaScript widgets 320 may correspond further with HTML packs 326 and/or CSS packs 328 to provide a viewable widget 330 that has a specified style and content presentation with interactive functionalities. Merely by way of example, such widgets may include active smart and/or static widgets on a UI of the mobile app and/or notifications which may pop up in the mobile app. The event listener 322 may process events from event sources, such as the JavaScript widget 320 displayed on the UI of the mobile app. For instance, the event listener 322 may detect when a user clicks on the displayed widget and/or when information, such as typed text, is received in at a widget. The event listener 322 may be configured to catch such events via the API 324 that communicates with a handler 332 of the HTTP adapter 316. Further, the API 324 may call up appropriate widgets 320 to send and/or otherwise provide to the mobile app via the presentation services 304.

The handler 332 may further be configured to interact with an API 334 at the handler 332, and/or a parser 336 and translator 338 by extension, in order to provide the presentation services 304. In an aspect, the HTTP adapter 316 may send and/or receive information, such as widgets, country-specific information, user inputs, and/or mobile app data, with the mobile app via the presentation services 304. In some examples, the HTTP adapter 316 and/or the presentation services 304 may handle encryption and/or decryption of data passed therebetween and/or with the mobile app.

In another aspect, a phonegap 340, such as Adobe PhoneGap, may facilitate the distribution of various features, such as the widgets, offered by the native wrapper 302 to be distributed via various vendor app stores, such as Apple and/or Android app stores, and/or to be installed at the end-user's mobile device. Phonegap 340 may enable wrapping up the JavaScript, HTML, and CSS codes in various manners that correspond to various device platforms, such as Android, iOS, Windows Phone, to create hybrid applications and/or features for distribution. In another aspect, a standard device features 342 module may be included to further facilitate packaging of the various codes.

Figure 4:
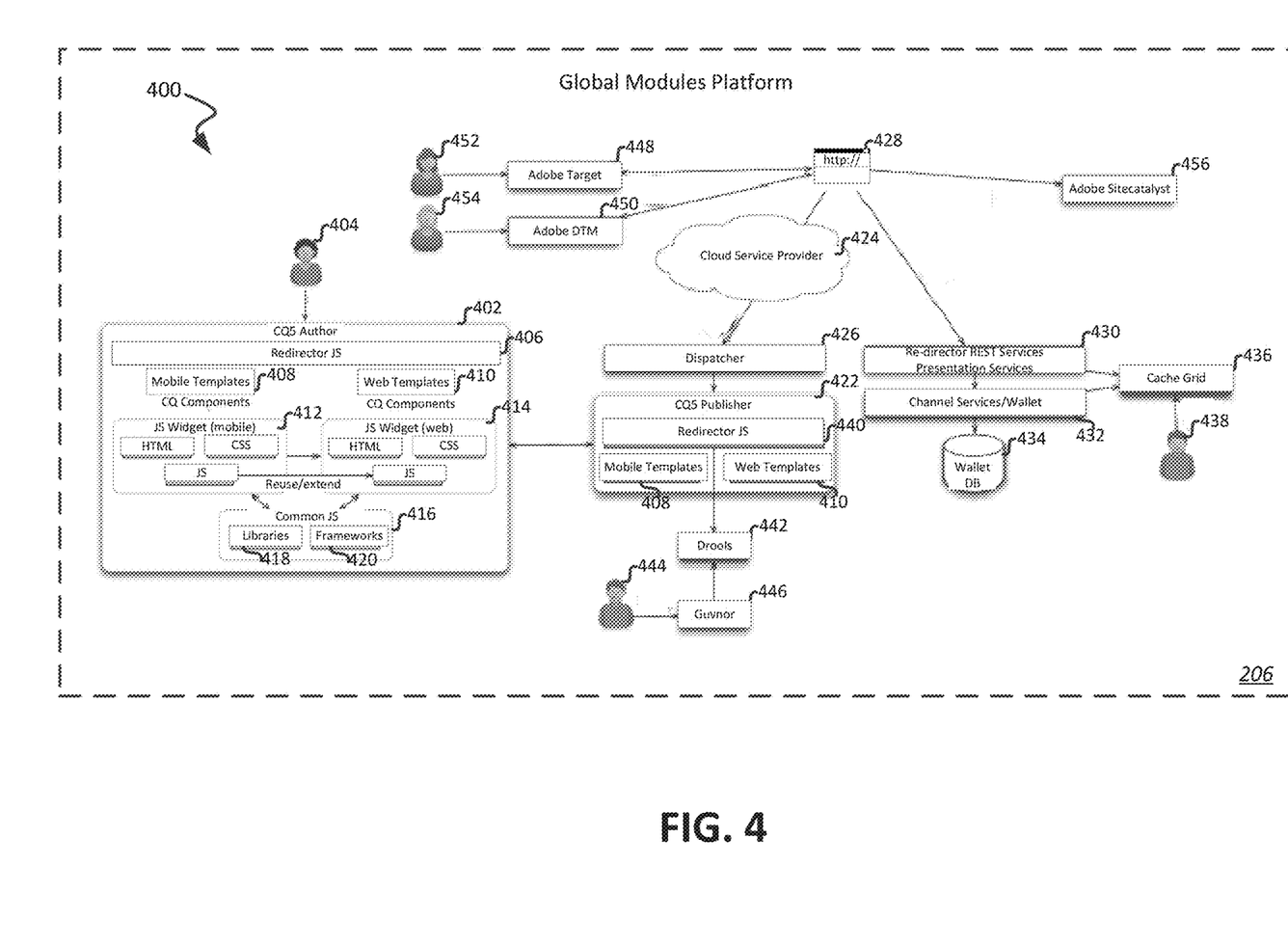
FIG. 4 shows an example architecture supporting a mobile website and/or a desktop website, according to various embodiments of the present invention.

Turning to FIG. 4, an example architecture 400 supporting a mobile website and/or a desktop website that may be provided on a laptop and/or desktop computer device, and/or a browser of a smart phone device, is shown. It is noted that additional components and/or connections thereof may be contemplated, and that such components and connections may be omitted in the figure for simplicity. Further, any connections may be unidirectional and/or bidirectional. It is contemplated that all or portions of the architecture 400 may be provided by the global modules platform 206 at the host system 204 of FIG. 2.

The architecture 400 may include a CQ5 author module 402 as a web content management system that enables users 404, such as content authors, administrators, and/or SEO (search engine optimization) users, to create, edit, manage, and/or optimize websites across different digital channels.

Such channels may include web, mobile, social, and so on. A redirector JavaScript module 406 may control which pages a browser gets directed to. Mobile and/or web templates 408,410 may be configured to provide different layout and/or site designs for the various mobile and/or desktop websites, respectively. Further, various JavaScript widgets, such as mobile widgets 412 for mobile websites and/or web widgets 414 for desktop websites may be provided and/or shared therebetween. For instance, JavaScript mobile widgets 412 for the mobile websites may be reused and/or extended for application in the JavaScript web widgets 414. Further, other common JavaScript modules 416, such as libraries 418 and/or frameworks 420, may be accessed by and/or otherwise facilitate the provision of the mobile widgets 412 and web widgets 414. In an example, the Javascript mobile widgets 412 and web widgets 414 may be wrapped inside one or more CQ components, such as the mobile and/or web templates 408,410, and CQ pages may be created using such components.

The CQ5 author 402 may publish the pages and/or content, such as the web and/or mobile templates 408,410, with a CQ5 Publisher 422. Such published pages and/or content may be downloaded and/or cached on a client. For instance, a cloud services provider 424 such as Akamai may download the published pages and/or content, in some cases with aid and/or further security via a dispatcher module 426, and provide the published, front-end website 428 to customer devices that navigate to a URL of the published front-end website 428.

Dynamic data may be fetched by JavaScript using presentation services, such as a re-director REST services presentation service 430 via REST APIs. The fetched data may be collected in channel services/wallet 432, and subsequently stored in a wallet database 434. In another aspect, the fetched data from the presentation service 430 and/or from the channel services/wallet 432 may be passed through a cache grid 436. The cache grid 436 may receive user input from one or more system administrators 438 to manage various caches and/or configurations.

A redirector JavaScript 440 of the CQ5 Publisher 422 in communication with a drools module 442 may access the drools module 442, which may offer a business rules engine, web authorizing and/or rule management tools. In one example, a rules administrator 444 may write and/or otherwise provide and manage knowledge in the drools module 442 for the redirector JavaScript 440 via a guvnor 446 or business rules manager.

Further, JavaScript may be injected into the published front-end website 428 based on various configurations within an Adobe Target module 448 and/or an Adobe DTM module 450. The Adobe Target module 448 may aid a marketer 452 in testing and/or managing various campaigns and offers that are provided to customers via the front-end website 428. For instance, the Adobe Target module 448 may capture various data related to site visitors, such as time of day, referral URLs, IP addresses, and/or provide product recommendations or other analyses based on such data. The Adobe DTM module 450 may aid a marketer 454 by providing a dynamic tag management ("DTM") system that tags and/or otherwise tracks user interactions on any page, for instance with any of the mobile widgets 412, web widgets 414, and/or advertisements published on the front-end website 428. Javascript send-offs of data and/or events captured at the front-end website 428 may be sent to an Adobe Sitecatalyst module 456, which may provide various marketing analytics. Other examples are possible.

Figure 5:
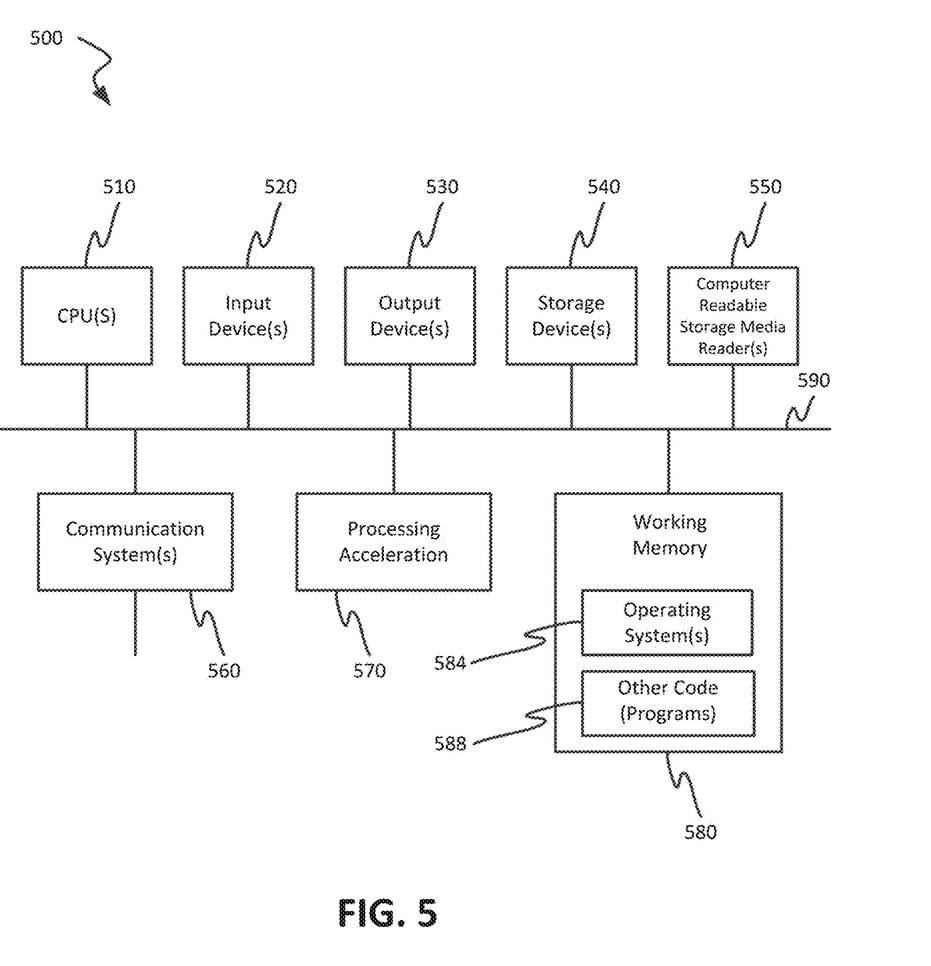
FIG. 5 shows an example computer architecture upon which various aspects of the present invention may be implemented.

Turning now to FIG. 5, a block diagram is shown illustrating a computer system upon which embodiments of the present invention may be implemented. This example illustrates a computer system 500 such as may be used, in whole, in part, or with various modifications, to provide the functions of any of the features and/or components of the invention discussed herein.

The computer system 500 is shown comprising hardware elements that may be electrically coupled via a bus 590. The hardware elements may include one or more central processing units 510, one or more input devices 520 (e.g., a mouse, a keyboard, etc.), and one or more output devices 530 (e.g., a display device, a printer, etc.). The computer system 500 may also include one or more storage device 540. By way of example, storage device(s) 540 may be disk drives, optical storage devices, solid-state storage device such as a random access memory ("RAM") and/or a read-only memory ("ROM"), which can be programmable, flash-updateable and/or the like.

The computer system 500 may additionally include a computer-readable storage media reader 550, a communications system 560 (e.g., a modem, a network card (wireless or wired), an infra-red communication device, Bluetooth™ device, cellular communication device, etc.), and working memory 580, which may include RAM and ROM devices as described above. In some embodiments, the computer system 500 may also include a processing acceleration unit 570, which can include a digital signal processor, a special-purpose processor and/or the like.

The computer-readable storage media reader 550 can further be connected to a computer-readable storage medium, together (and, optionally, in combination with storage device(s) 540) comprehensively representing remote, local, fixed, and/or removable storage devices plus storage media for temporarily and/or more permanently containing computer-readable information. The communications system 560 may permit data to be exchanged with a network, system, computer and/or other component described above.

The computer system 500 may also comprise software elements, shown as being currently located within a working memory 580, including an operating system 584 and/or other code 588. It should be appreciated that alternate embodiments of a computer system 500 may have numerous variations from that described above. For example, customized hardware might also be used and/or particular elements might be implemented in hardware, software (including portable software, such as applets), or both. Furthermore, connection to other computing devices such as network input/output, data acquisition devices, and/or servers may also occur.

Software of computer system 500 may include code 588 for implementing any or all of the function of the various elements of the architecture as described herein. For example, software, stored on and/or executed by a computer system such as system 500, can provide any of the functions and/or other components of the invention such as those discussed above.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for configuring a web application for global money transfers, comprising:
   receiving, by a host computer, an indication of an initiation of a global money transfer from the web application operating on a customer device;
   requesting, by the host computer, geocoordinates of a customer device hosting the web application, wherein the geocoordinates indicate a location of the customer device;
   collecting, by the host computer, data from the web application, wherein the data includes the geocoordinates of the customer device requested by the host computer;
   determining, by the host computer, a first set of country-specific data based on the geocoordinates of the customer device, wherein the first set of country-specific data includes a compliance regulation of a country in which the geocoordinates indicate the customer device is located;
   determining, by the host computer, a first identification requirement based on the compliance regulation of the country in which the geocoordinates indicate the customer device is located;
   generating, a first dynamic widget to receive the first identification requirement;
   causing, by the host computer, a user interface ("UP") of the web application to display the first dynamic widget;
   determining, by the host computer, a destination country of the global money transfer associated with the customer device;
   determining, by the host computer, a second set of country-specific data based on the destination country of the global money transfer associated with the customer device, wherein the second set of country-specific data includes a compliance regulation of the destination country of the global money transfer, wherein the first set of country-specific data and the second set of country-specific data are associated with different countries;
   determining, by the host computer, a second identification requirement based on the compliance regulation of the destination country of the global money transfer;
   generating, a second dynamic widget to receive the second identification requirement, wherein the first dynamic widget and the second dynamic widget are separate widgets;
   causing, by the host computer, the UI of the web application to be reconfigured to display the first dynamic widget and the second dynamic widget;
   receiving, via the first dynamic widget, an indication of a first type of government-issued identification document based on the first identification requirement;
   receiving, via the second dynamic widget, an indication of a second type of government-issued identification document based on the second identification requirement;
   processing the global money transfer based at least in part on the indication of the first type of government-issued identification document and the second type of government-issued identification document; and
   updating, by the web application, a library of compliance regulations and associated reconfigurations of the web application with the first set of country-specific data and the second set of country-specific data.

2. The method for configuring a web application for global money transfers of claim 1, further comprising:
   connecting, by the host computer, with the web application via a wireless communications network to wirelessly receive the data from the customer device, wherein the customer device comprises at least one of a smart phone, a tablet, or a laptop.

3. The method for configuring a web application for global money transfers of claim 1, wherein:
   the first set of country-specific data determined by the host computer based on the geocoordinates of the customer device includes an identification of a currency of a country in which the geocoordinates indicate the customer device is located.

4. The method for configuring a web application for global money transfers of claim 1, wherein:
   the first set of country-specific data determined by the host computer based on the geocoordinates of the customer device includes an exchange rate for a currency of a country in which the geocoordinates indicate the customer device is located.

5. The method for configuring a web application for global money transfers of claim 1, further comprising:
   providing, by the host computer, one or more dynamic widgets for the UI of the web application, wherein the one or more dynamic widgets may be configurable to meet country-specific requirements.

6. The method for configuring a web application for global money transfers of claim 5, further comprising:
   sending, from the host computer, instructions to the UI of the web application indicating for display of the one or more dynamic widgets, wherein the instructions are communicated by an API of the host computer.

7. A system for configuring a web application for global money transfers, comprising:
   a host computer, wherein the host computer is configured to:
      receive an indication of an initiation of a global money transfer from the web application operating on a customer device;
      request geocoordinates of a customer device hosting the web application, wherein the geocoordinates indicate a location of the customer device;
      collect data from a web application, wherein the data includes the geocoordinates of the customer device requested by the host computer;
      determine a first set of country-specific data based on the geocoordinates of the customer device, wherein the first set of country-specific data includes a compliance regulation of a country in which the geocoordinates indicate the customer device is located;

determine a first identification requirement based on the compliance regulation of the country in which the geocoordinates indicate the customer device is located;

generate, a first dynamic widget to receive the first identification requirement;

cause, by the host computer, a user interface ("UP") of the web application to display the first dynamic widget;

determine a destination country of the global money transfer associated with the customer device;

determine a second set of country-specific data based on destination country of the global money transfer associated with the customer device, wherein the second set of country-specific data includes a compliance regulation of the destination country of the global money transfer, wherein the first set of country-specific data and the second set of country-specific data are associated with different countries;

determine a second identification requirement based on the compliance regulation of the destination country of the global money transfer;

generate, a second dynamic widget to receive the second identification requirement, wherein the first dynamic widget and the second dynamic widget are separate widgets;

cause the UI of the web application to be reconfigured to display the first dynamic widget and the second dynamic widget;

receive, via the first dynamic widget, an indication of a first type of government-issued identification document based on the first identification requirement;

receive, via the second dynamic widget, an indication of a second type of government-issued identification document based on the second identification requirement;

process the global money transfer based at least in part on the indication of the first type of government-issued identification document and the second type of government-issued identification document; and cause the web application to update a library of compliance regulations and associated reconfigurations of the web application with the first set of country-specific data and the second set of country-specific data.

8. The system for configuring a web application for global money transfers of claim 7, wherein:

the customer device comprises at least one of a smart phone, a tablet, and a laptop in wireless communication with the host computer.

9. The system for configuring a web application for global money transfers of claim 7, wherein the first set of country-specific data includes a currency.

10. The system for configuring a web application for global money transfers of claim 7, wherein the host computer is further configured to:

provide one or more dynamic widgets for the UI of the web application, wherein the one or more dynamic widgets may be configurable to meet country-specific requirements based at least in part on the compliance regulations indicated in the first set of country-specific data or the compliance regulations indicated in the second set of country-specific data.

11. The system for configuring a web application for global money transfers of claim 10, wherein the host computer is further configured to:

send instructions to the UI of the web application indicating for display of the one or more dynamic widgets, wherein the instructions are communicated by an API of the host computer.

12. A non-transitory, computer-readable medium having instructions stored thereon for configuring a web application for global money transfers, the instructions executable by one or more processors for at least:

receiving, by a host computer, an indication of an initiation of a global money transfer from the web application operating on a customer device;

requesting, by the host computer, geocoordinates of a customer device hosting the web application, wherein the geocoordinates indicate a location of the customer device;

collecting, by the host computer, data from the web application, wherein the data includes the geocoordinates of the customer device requested by the host computer;

determining, by the host computer, a first set of country-specific data based on the geocoordinates of the customer device, wherein the first set of country-specific data includes a compliance regulation of a country in which the geocoordinates indicate the customer device is located;

determining, by the host computer, a first identification requirement based on the compliance regulation of the country in which the geocoordinates indicate the customer device is located;

generating, a first dynamic widget to receive the first identification requirement;

causing, by the host computer, a user interface ("UP") of the web application to display the first dynamic widget;

determining, by the host computer, a destination country of the global money transfer associated with the customer device;

determining, by the host computer, a second set of country-specific data based on the destination country of the global money transfer associated with the customer device, wherein the second set of country-specific data includes a compliance regulation of the destination country of the global money transfer, wherein the first set of country-specific data and the second set of country-specific data are associated with different countries;

determining, by the host computer, a second identification requirement based on the compliance regulation of the destination country of the global money transfer;

generating, a second dynamic widget to receive the second identification requirement, wherein the first dynamic widget and the second dynamic widget are separate widgets;

causing, by the host computer, the UI of the web application to be reconfigured to display the first dynamic widget and the second dynamic widget;

receiving, via the first dynamic widget, an indication of a first type of government-issued identification document based on the first identification requirement;

receiving, via the second dynamic widget, an indication of a second type of government-issued identification document based on the second identification requirement;

processing the global money transfer based at least in part on the indication of the first type of government-issued identification document and the second type of government-issued identification document; and updating, by the web application, a library of compliance regulations and associated reconfigurations of the web application with the first set of country-specific data and the second set of country-specific data.

13. The non-transitory, computer-readable medium of claim 12, wherein the instructions are further executable for at least:

providing one or more dynamic widgets for the UI of the web application, wherein the one or more dynamic widgets may be configurable to meet country-specific requirements based at least in part on the compliance regulations indicated in the first set of country-specific data or the compliance regulations indicated in the second set of country-specific data.

14. The non-transitory, computer-readable medium of claim 13, wherein the instructions are further executable for at least:

sending instructions to the UI of the web application indicating for display of the one or more dynamic widgets, wherein the instructions are communicated by an API of the host computer.

\* \* \* \* \*

UNITED STATES PATENT AND TRADEMARK OFFICE
CERTIFICATE OF CORRECTION

PATENT NO. : 10,977,640 B2
APPLICATION NO. : 14/793222
DATED : April 13, 2021
INVENTOR(S) : Vijaya Kouru, Tarun Bhagwan and Sanjay Saraf It is certified that error appears in the above-identified patent and that said Letters Patent is hereby corrected as shown below:

In the Claims

In Column 15, Claim 1, Line 44, please delete "("UP")" and insert -- ("UI") --

In Column 17, Claim 7, Line 7, please delete "("UP")" and insert -- ("UI") --

In Column 18, Claim 12, Line 33, please delete "("UP")" and insert -- ("UI") --

Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*